United States Patent [19]

Freeman

[11] Patent Number: 5,653,003
[45] Date of Patent: Aug. 5, 1997

[54] SHOULDER HARNESS RECOIL RESTRAINT CLIP

[76] Inventor: William David Freeman, 7875 Castlewood Way, Mobile, Ala. 36619

[21] Appl. No.: 627,983

[22] Filed: Apr. 4, 1996

[51] Int. Cl.⁶ ................................................. A44B 21/00
[52] U.S. Cl. ................... 24/543; 24/556; 24/487; 24/298
[58] Field of Search ................... 24/298, 543, 556, 24/487, 518, 544; 297/483; 280/808

[56] References Cited

U.S. PATENT DOCUMENTS

| | | | |
|---|---|---|---|
| 852,180 | 4/1907 | Hoffman | 24/298 X |
| 1,155,296 | 9/1915 | Beuther | 24/298 X |
| 1,414,816 | 5/1922 | Killion | 24/544 X |
| 3,822,052 | 7/1974 | Lange | 24/543 X |
| 3,824,654 | 7/1974 | Takabayashi | 24/562 X |
| 3,900,989 | 8/1975 | Weisenthal | 24/543 X |
| 4,212,303 | 7/1980 | Nolan | 24/543 X |
| 5,050,272 | 9/1991 | Robinson et al. | 24/543 X |
| 5,058,922 | 10/1991 | Long | 280/808 |
| 5,201,099 | 4/1993 | Campbell . | |
| 5,265,910 | 11/1993 | Barr et al. . | |
| 5,308,116 | 5/1994 | Zawisa et al. . | |
| 5,350,196 | 9/1994 | Atkins . | |
| 5,423,831 | 6/1995 | Nates | 24/543 X |

FOREIGN PATENT DOCUMENTS

| | | | |
|---|---|---|---|
| 2654050 | 5/1991 | France | 280/808 |
| 405038999 | 2/1993 | Japan | 280/808 |

*Primary Examiner*—James R. Brittain
*Assistant Examiner*—Hanh V. Tran
*Attorney, Agent, or Firm*—Joseph N. Breaux

[57] ABSTRACT

A shoulder harness recoil restraint clip comprising a clip member having first and second engagement portions flexibly connected by a flex hinge that allows the first and second engagement portions to rotate in a manner such that a first surface of the first engagement portion covered with a first plurality of gripping ridges is rotatable into a position contacting a second surface of the second engagement portion covered with a second plurality of gripping ridges. The first and second engagement portions are lockable to a section of shoulder harness strap material adjacent the recoil mechanism by a locking tab positionable with a locking tab receiving channel formed through one of the engagement portions. The locking tab is held in place by locking tab ridges positioned on either side of a locking tab receiving channel. The locking tab has an engagement head adapted to seat between adjacent locking ridges.

12 Claims, 2 Drawing Sheets

SHOULDER HARNESS RECOIL RESTRAINT CLIP

TECHNICAL FIELD

The present invention relates to devices used to relieve the stress placed on the chest of a wearer of a shoulder harness vehicle restraint and more particularly to clip device securable to the shoulder harness vehicle restraint to prevent the shoulder harness recoil mechanism from placing undesirable force against the chest of the vehicle occupant wearing the shoulder harness.

BACKGROUND ART

Wearing a shoulder harness type vehicle restraint device can be uncomfortable for many individuals because the recoil mechanism generally provided on the shoulder harness can generate uncomfortable forces against the chest of the wearer. It would be desirable, therefore, to provide a device for preventing the recoil mechanism from placing undesirable forces against the chest of the shoulder harness wearer while still achieving the safety advantages of wearing a shoulder harness. It would also be a benefit if the device could be easily adjusted to comfortably accommodate different wearers without a complicated adjustment procedure. It would be a still further benefit if the device could be inexpensively manufactured and easily and quickly installed by a user without requiring extensive training or special tools. It would also be a benefit if the device were sufficiently portable to allow a guest passenger to carry the device in a pocket or handbag for use on any vehicle occupied by the guest passenger.

GENERAL SUMMARY DISCUSSION OF INVENTION

It is thus an object of the invention to provide a shoulder harness recoil restraint clip that is securable to the strap portion of a shoulder harness adjacent the shoulder harness recoil mechanism to prevent the recoil mechanism from placing undesirable forces against the chest of the shoulder harness wearer.

It is a further object of the invention to provide a shoulder harness recoil restraint clip that is easily adjusted to comfortably accommodate different wearers without a complicated adjustment procedure.

It is a still further object of the invention to provide a shoulder harness recoil restraint clip that is inexpensive to manufacture and is easily and quickly installed by a user without requiring extensive training or special tools.

It is a still further object of the invention to provide a shoulder harness recoil restraint clip that is sufficiently portable to allow a person to carry the clip in a pocket or handbag for use on any vehicle occupied by the person.

It is a still further object of the invention to provided a shoulder harness recoil restraint clip that accomplishes all or some of the above objects in combination.

Accordingly, a shoulder harness recoil restraint clip is provided. The restraint clip comprises a clip member having first and second engagement portions flexibly connected by a flex hinge that allows said first and second engagement portions to rotate in a manner such that a first surface of the first engagement portion covered with a first plurality of gripping ridges is rotatable into a position contacting a second surface of the second engagement portion covered with a second plurality of gripping ridges, the first engagement portion having a locking tab receiving channel formed therethrough having a first width and that is located at a first end of the first engagement portion opposite an end of the first engagement portion that is in connection with the flex hinge and a third plurality of locking tab ridges positioned on either side of the locking tab receiving channel that are oriented substantially perpendicular to a longitudinal axis of the locking tab receiving channel, the second engagement portion having a locking tab flexibly connected at a second end of the first engagement portion opposite an end of the second engagement portion that is in connection with the flex hinge, the locking tab having an engagement head adapted to seat between adjacent locking ridges and a flexible tab portion of a length selected in a manner such that when the engagement head is seated between a pair of locking ridges nearest the flex hinge the first and second plurality of gripping ridges are in contact with each other.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
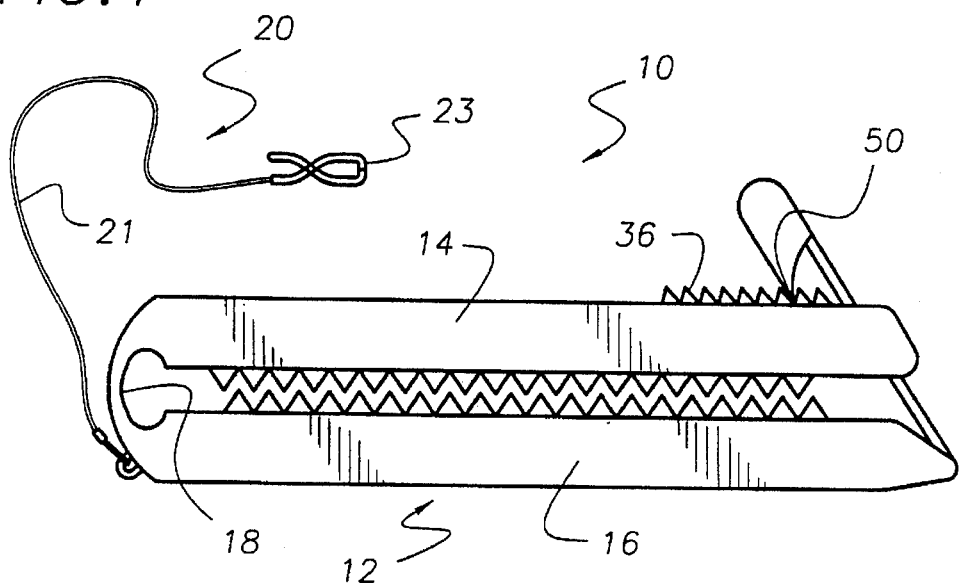
FIG. 1 is a side view of an exemplary embodiment of the restraint clip of the present invention showing the first and second engagement portions flexibly connected with an integrally formed flex hinge, the locking tab engaging one of the locking tab ridges, and the tether line secured to the flex hinge at one end thereof.

FIG. 1 shows an exemplary embodiment of the shoulder harness recoil restraint clip of the present invention generally designated by the numeral 10. Restraint clip 10 includes a clip member, generally designated by the numeral 12, having first and second engagement portions 14,16 flexibly connected by a flex hinge 18; and a securing tether assembly, generally designated by the numeral 20, having a flexible tether member 21 secured at one end to flex hinge 18 and provided with a spring biased clip 23 at a second end thereof. In this embodiment, first and second engagement portions 14,16, and flex hinge 18 are integrally molded from nylon. Each of the first and second engagement portions is about three and one-half (3-½") inches long and about three-quarters (¾") of an inch wide.

Figure 2:
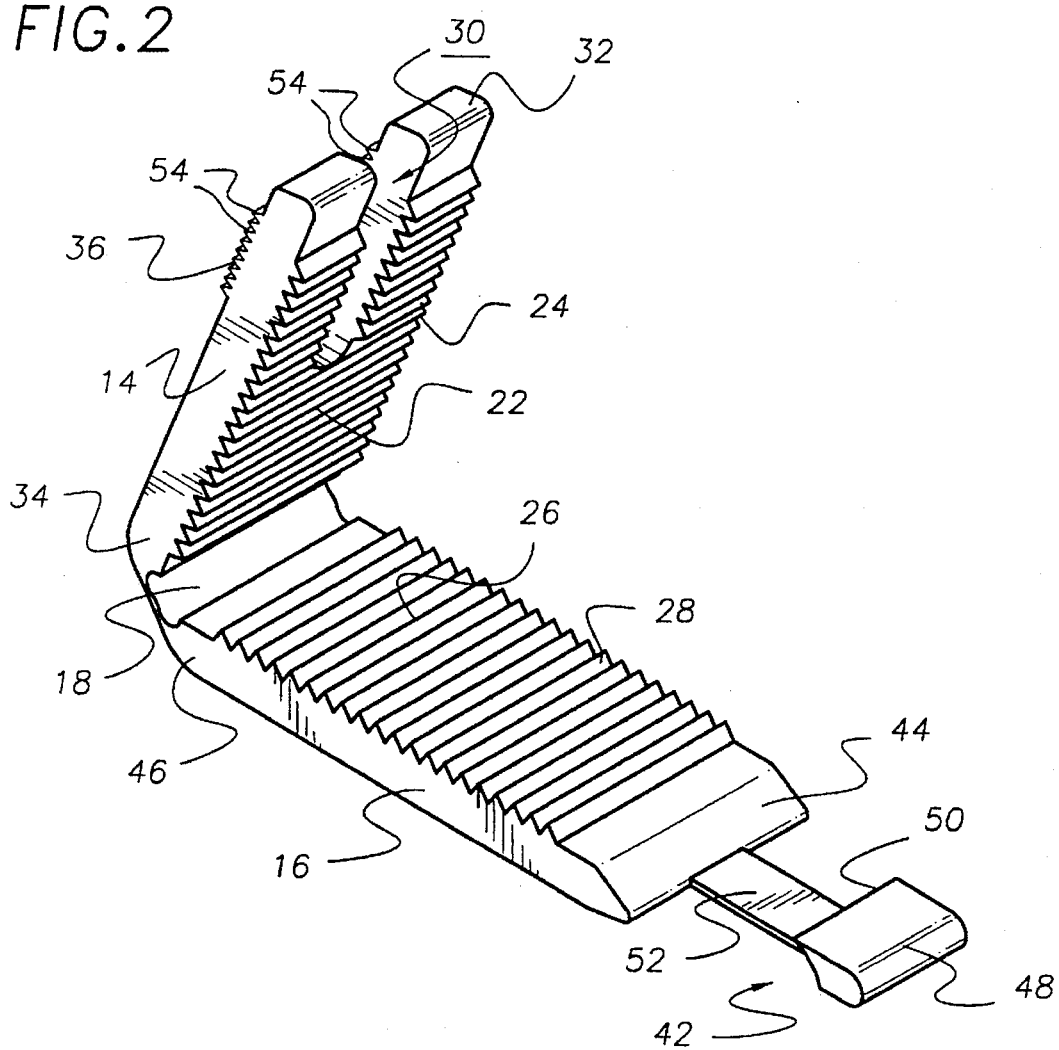
FIG. 2 is a top view of the restraint clip of FIG. 1 showing the locking tab channel formed through the first engagement portion, a group of locking tab rides formed on either side of the locking tab channel, and the locking tab rotated back out of engagement with the locking tab ridges.
Figure 3:
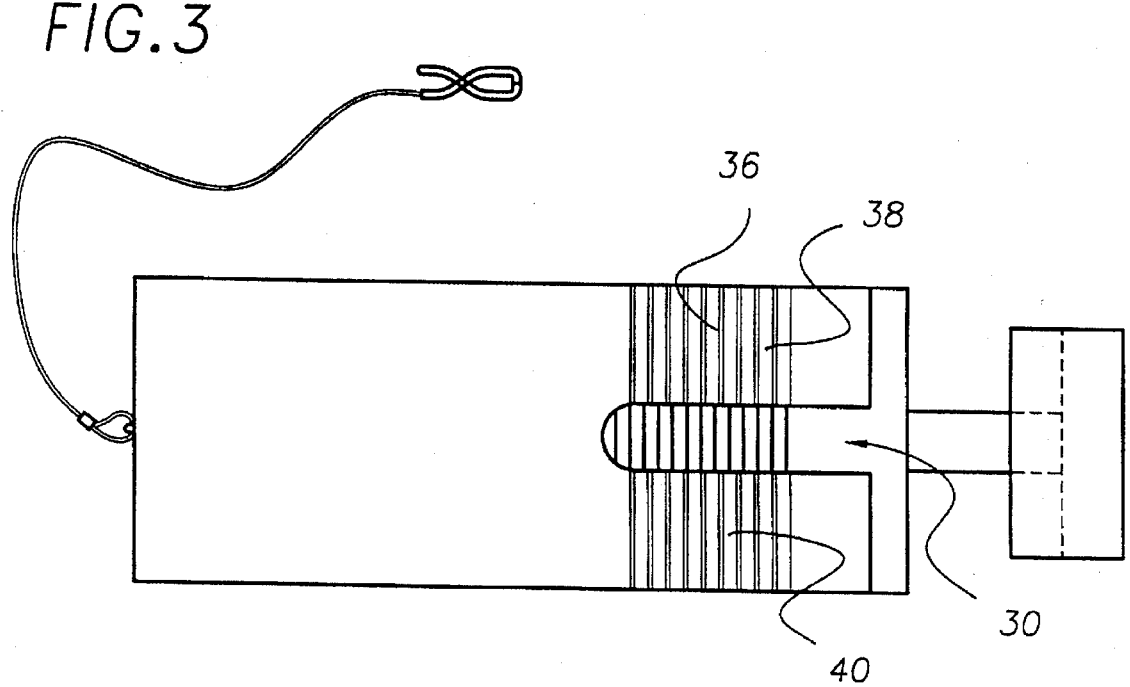
FIG. 3 is a perspective view of the restraint clip of FIG. 1 showing the first and second groups of gripping ridges formed on the first and second engagement portions.

With reference to FIG. 2, flex hinge 18 allows first and second engagement portions 14,16 to pivot with respect to each other in a manner such that a first surface 22 of first engagement portion 14 covered with twenty gripping ridges 24 is pivotable into a position contacting a second surface 26 of second engagement portion 16 that is covered with twenty gripping ridges 28. First engagement portion 14 has a looking tab receiving channel 30 formed therethrough that is located at a first end 32 of first engagement portion 14 opposite an end 34 of first engagement portion 14 that is in connection with flex hinge 18. With reference to FIG. 3, nine locking tab ridges 36 are positioned on either side 38,40 of locking tab receiving channel 30. Locking tab ridges 36 are oriented substantially perpendicular to a longitudinal axis of locking tab receiving channel 30.

With reference once again to FIG. 2, second engagement portion 16 has a locking tab, generally referenced by the numeral 42, integrally formed at a second end 44 thereof that is opposite an end 46 thereof that is in connection with flex hinge 18. Locking tab 42 has an engagement head 48 having an engagement edge 50 adapted to seat between adjacent locking ridges 36 and a flexible tab portion 52 of a length selected in a manner such that when engagement edge 50 of engagement head 48 is seated between the last pair 54 of locking ridges 36 that are nearest flex hinge 18, gripping ridges 24 are locked in contact with gripping ridges 28. In this embodiment, flexible tab portion 52 is about one-half (½") inch in length. FIG. 1 shows engagement edge 50 seated between a pair of locking ridges 36 locking first engagement portion 14 and second engagement portion 16 together in a manner such that first engagement portion 14 cannot pivot away from second engagement portion 16.

Figure 4:
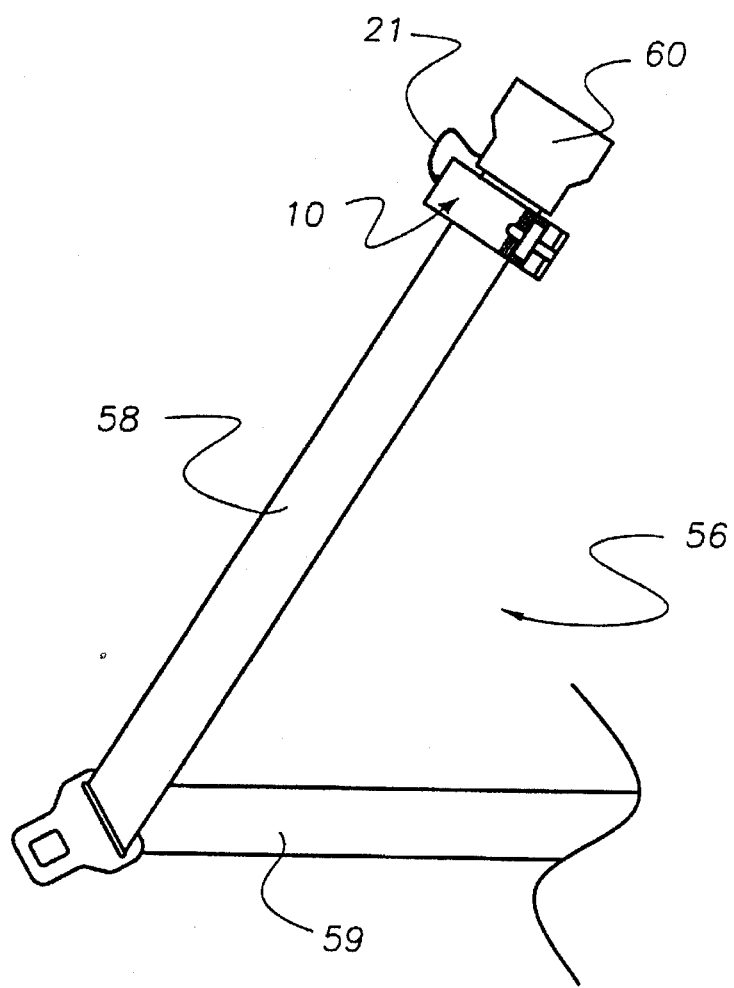
FIG. 4 is a plan view of the restraint clip of FIG. 1 secured to a section of shoulder harness strap adjacent to the shoulder harness strap recoil mechanism.

FIG. 4 shows a representative shoulder harness assembly, generally designated by the numeral 56, including a shoulder harness strap 58, lap strap 59, and a strap recoiling mechanism 60. Strap recoiling mechanism 60 is spring loaded and causes harness strap 58 to rewind into strap recoiling mechanism 60 unless resisted by a forge. In use, the resisting force is generally provided by the chest of the passenger wearing shoulder harness assembly 56. Also shown in the figure is restraining clip 10 clipped onto a section a harness strap 58, positioned adjacent recoiling mechanism 60 and providing the resisting force necessary to prevent recoil mechanism 60 from pulling harness strap 58 against the chest of the wearer. With general reference to FIGS. 1–4, restraining clip 10 is clipped onto harness strap 58 by positioning a section of harness strap 58 between first and second engagement portions 14,16, pivoting first and second engagement portion 14,16 together, pivoting locking tab 42 toward first engagement portion 14 until flexible tab portion 52 is positioned within locking tab receiving channel 30 and engagement edge 50 of engagement head 48 is seated between a pair of adjacent locking ridges 36. With engagement edge 50 in this position, harness strap 58 is secured between first and second engagement portion 14,16 and harness strap 58 will only rewind into recoil mechanism 60 up to the point where restraint clip 10 is positioned. It can be seen that by positioning restraint clip 10 onto a desired section of harness strap 58 the desired degree of looseness can be achieved between the passenger and harness strap 58.

It can be seen from the preceding description that a shoulder harness recoil restraint clip has been provided that is securable to the strap portion of a shoulder harness adjacent the shoulder harness recoil mechanism to prevent the recoil mechanism from placing undesirable forces against the chest of the shoulder harness wearer; that is easily adjusted to comfortably accommodate different wearers without a complicated adjustment procedure; that is inexpensive to manufacture and is easily and quickly installed by a user without requiring extensive training or special tools; and that is sufficiently portable to allow a person to carry the clip in a pocket or handbag for use on any vehicle occupied by the person.

It is noted that the embodiment of the shoulder harness recoil restraint clip described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A shoulder harness recoil restraint clip comprising:
   a clip member having first and second engagement portions flexibly connected by a flex hinge that allows said first and second engagement portions to rotate in a manner such that a first surface of said first engagement portion covered with a first plurality of gripping ridges is rotatable into a position contacting second surface of said second engagement portion covered with a second plurality of gripping ridges;
   said first engagement portion having a locking tab receiving channel formed therethrough having a first width and that is located at a first end of said first engagement portion opposite an end of said first engagement portion that is in connection with said flex hinge and a third plurality of locking tab ridges positioned on either side of said locking tab receiving channel wherein the third plurality of locking tab ridges extend upwardly from a planar surface of said first engagement portion and are oriented substantially perpendicular to a longitudinal axis of said locking tab receiving channel;
   said second engagement portion having a locking tab flexibly connected at a second end of said second engagement portion opposite an end of said second engagement portion that is connection with said flex hinge, said locking tab having an engagement head adapted to seat between adjacent locking tab ridges and a flexible tab portion of a length selected in a manner such that said engagement head can be seated between a pair of locking tab ridges positioned nearest said flex hinge.

2. The shoulder harness recoil restraint clip of claim 1, further including:
   a securing tether assembly having a flexible tether member secured at one end to said flex hinge and provided with a spring biased clip at a second end thereof.

3. The shoulder harness recoil restraint clip of claim 2, wherein:
   said first and second engagement portions and said flex hinge are integrally formed.

4. The shoulder harness recoil restraint clip of claim 3 wherein:
   said locking tab has an engagement head having an engagement edge adapted to seat between adjacent locking ridges.

5. The shoulder harness recoil restraint clip of claim 4 wherein:
   said locking tab further includes a flexible tab portion of a length selected in a manner such that when said engagement edge of said engagement head is seated between a last pair of locking ridges that are positioned nearest said flex hinge, said first plurality of gripping ridges are locked in contact with said second plurality of gripping ridges.

6. The shoulder harness recoil restraint clip of claim 2 wherein:
   said locking tab has an engagement head having an engagement edge adapted to seat between adjacent locking ridges.

7. The shoulder harness recoil restraint clip of claim 6 wherein:

said locking tab further includes a flexible tab portion of a length selected in a manner such that when said engagement edge of said engagement head is seated between a last pair of locking ridges that are positioned nearest said flex hinge, said first plurality of gripping ridges are locked in contact with said second plurality of gripping ridges.

8. The shoulder harness recoil restraint clip of claim 1, wherein:

said first and second engagement portions and said flex hinge are integrally formed.

9. The shoulder harness recoil restraint clip of claim 8 wherein:

said locking tab has an engagement head having an engagement edge adapted to seat between adjacent locking ridges.

10. The shoulder harness recoil restraint clip of claim 9 wherein:

said locking tab further includes a flexible tab portion of a length selected in a manner such that when said engagement edge of said engagement head is seated between a last pair of locking ridges that are positioned nearest said flex hinge, said first plurality of gripping ridges are locked in contact with said second plurality of gripping ridges.

11. The shoulder harness recoil restraint clip of claim 1 wherein:

said locking tab has an engagement head having an engagement edge adapted to seat between adjacent locking ridges.

12. The shoulder harness recoil restraint clip of claim 11 wherein:

said locking tab further includes a flexible tab portion of a length selected in a manner such that when said engagement edge of said engagement head is seated between a last pair of locking ridges that are positioned nearest said flex hinge, said first plurality of gripping ridges are locked in contact with said second plurality of gripping ridges.

* * * * *